(12) United States Patent
Shaw et al.

(10) Patent No.: US 9,339,999 B2
(45) Date of Patent: May 17, 2016

(54) SPLICING TAPE FOR CONTINUOUS ROLL CHANGE AND METHOD OF MANUFACTURE

(71) Applicant: 3M INNOVATIVE PROPERTIES COMPANY, St. Paul, MN (US)

(72) Inventors: Robert G. Shaw, Venlo (NL); Benjamin S. Korth, Duesseldorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 9 days.

(21) Appl. No.: 14/372,154

(22) PCT Filed: Jan. 16, 2013

(86) PCT No.: PCT/US2013/021633
§ 371 (c)(1),
(2) Date: Jul. 14, 2014

(87) PCT Pub. No.: WO2013/109566
PCT Pub. Date: Jul. 25, 2013

(65) Prior Publication Data
US 2015/0030813 A1    Jan. 29, 2015

(30) Foreign Application Priority Data

Jan. 16, 2012    (EP) .................................... 12151287

(51) Int. Cl.
*B65H 19/10*    (2006.01)
*B32B 37/12*    (2006.01)
*B32B 37/20*    (2006.01)

(52) U.S. Cl.
CPC ................. *B32B 37/12* (2013.01); *B32B 37/20* (2013.01); *B65H 19/102* (2013.01); *B32B 2405/00* (2013.01); *B65H 2301/41766* (2013.01); *Y10T 428/24612* (2015.01)

(58) Field of Classification Search
CPC ................. Y10T 428/15; B65H 19/02; B65H 2301/41766; B65H 2301/46078
USPC ................................................. 428/43, 80, 81
See application file for complete search history.

(56) References Cited

U.S. PATENT DOCUMENTS

| 4,388,432 A | 6/1983 | Eskay |
| 4,413,080 A | 11/1983 | Blake |

(Continued)

FOREIGN PATENT DOCUMENTS

EP    0 941 954    9/1999

OTHER PUBLICATIONS

PCT International Search Report from PCT/US2013/021633 mailed on May 14, 2013, 4 pages.

(Continued)

*Primary Examiner* — Alexander Thomas
(74) *Attorney, Agent, or Firm* — Dena M. Ehrich

(57) ABSTRACT

The present invention relates to a splicing tape (1) for continuous roll change, the splicing tape comprising: a) a first tape component including a first backing layer (2) and a first adhesive layer (3) on a first surface of the first backing layer (2); b) a second tape component including a second backing layer (4) and a second adhesive layer (5) on a first surface of the second backing layer (4); and c) a splitting layer (6) joining the first backing layer (2) and the second backing layer (4) together, such that the first and second adhesive layers (3,5) are facing away from the splitting layer (6), wherein the splitting layer (6) comprises a continuous and uninterrupted middle area (7) extending in the longitudinal direction of the splicing tape (1) and provided with repeating tapered protrusions (2) with flattened tips projecting from the middle area (7) towards both longitudinal edges of the splicing tape and to a method for manufacturing and using such a splicing tape.

13 Claims, 10 Drawing Sheets

(56) References Cited

U.S. PATENT DOCUMENTS

| | | |
|---|---|---|
| 4,482,675 A | 11/1984 | Witt |
| 4,569,960 A | 2/1986 | Blake |
| 5,102,733 A | 4/1992 | Zawadzki |
| 5,125,995 A | 6/1992 | D'Haese et al. |
| 5,380,779 A | 1/1995 | D'Haese |
| 5,901,919 A | 5/1999 | Wienberg |
| 5,996,927 A | 12/1999 | Weirauch et al. |
| 7,087,278 B2 | 8/2006 | Eikmeier et al. |
| 7,931,774 B2 | 4/2011 | Hall et al. |
| 8,287,973 B2 | 10/2012 | Nagel et al. |
| 8,354,152 B2 | 1/2013 | Götz et al. |
| 8,597,751 B2 | 12/2013 | Götz et al. |
| 2013/0112341 A1 | 5/2013 | Nagel et al. |

OTHER PUBLICATIONS

Satasd, Donatas, Handbook of Pressure Sensitive Adhesive Technology, 2nd edition, 1989.

SPLICING TAPE FOR CONTINUOUS ROLL CHANGE AND METHOD OF MANUFACTURE

TECHNICAL FIELD OF THE INVENTION

The present invention relates to a splicing tape suitable for continuous roll change and methods of manufacturing and using such a splicing tape.

BACKGROUND OF THE INVENTION

Splicing tapes are generally used for preparing a joint between two sheet materials, for example, between the leading edge portion of the outer turn of a roll of sheet material and a second roll of sheet material. The splicing operation can be performed in a static or dynamic mode.

In the static mode, the first and second sheet material may at first be positioned in the desired configuration relative to each other, and one or more splicing tapes are then applied to join the two sheets together. It is also possible to apply the splicing tape or tapes to one of the sheet materials first. Then, the second sheet material is provided, positioned in the desired configuration and the two sheet materials are joined. Splices which are obtained in a static mode of preparation are often referred to as "permanent" splices. Some typical configurations of static splices are butt splices, overlap splices and staggered overlap splices.

However, it is often desirable to prepare splices in a dynamic mode. In the printing industry, this technique allows joining the leading edge of a new roll of paper sheet material to the trailing edge of a depleting roll of paper sheet material without requiring interruption of the continuous production process. Splices which are obtained in a dynamic mode of operation are usually referred to as flying splices.

A first type of splicing tapes is currently known in the art, in which the splicing tapes are provided with a continuous splitting layer over the whole width of the backing layer. Such constructions may have the drawback that the pulling force required to start the separation process of the splittable material commonly referred to as "breakout force" is higher than the force needed for the continuation of the splitting process commonly referred to as "peel force". This peak-breakout force may lead to a jolt during the continuous roll change which may lead in some cases to tearing of the paper web, paper wrinkling, or adhesive failure of the splicing tape. All these situations should obviously be avoided as they most likely lead to unsuccessful roll changes. In the context of a splicing operation between two sheet material rolls, jolting is meant to refer to a sudden increase in web tension at the instant the splice takes place.

Another conventional way of making a flying splicing tape uses destructible nose tabs as described in WO 95/29115 A1.

Yet another splicing tape useful in preparing a flying splice is described in EP 0 941 954 A1. This splicing tape uses a non-tacky polymer layer in contact with a carrier layer. The materials are chosen so as to control the separation force between the non-tacky polymer layer and the carrier layer. An optional adhesion controlling layer may be applied between the non-tacky polymer layer and the carrier layer.

Another type of a known splicing tape includes a central paper layer or tissue layer which splits in use. For example, U.S. Pat. No. 5,901,919 A1 shows an adhesive tape for continuous roll change in paper finishing machines or the like, having a paper backing and a water-soluble or water-dispersible self-adhesive composition, characterised in that the paper backing is coated on one side with a water-soluble or water-dispersible self-adhesive composition while part of the reverse side of the paper backing is provided with a double-sided adhesive tape, which in turn has a readily splittable splicing paper backing which is provided on both sides with a water-soluble or water-dispersible self-adhesive composition.

In EP 1 355 843 A1, another adhesive tape for flying splice is described. This tape has a relatively broad first backing layer which is provided on one of its major surfaces with a highly tacky adhesive layer. On the opposing main surface, this backing layer is provided with a strip of splittable material having an adhesive layer on its major surface facing away from the backing layer. The strip of splittable material is positioned at or near a longitudinal edge of the tape and covers only a small fraction of the backing layer. The splittable material is further provided with a serrated edge on its longitudinal side facing the leading edge of the splicing tape.

From WO 2007/048695 A1, a splicing tape is known which comprises also a broad backing layer which is provided only over a part of its width with a layer of splittable material. The splittable material has a serrated leading edge with bent tips, whereas the opposing trailing edge is serrated with pointy tips.

Yet another splicing tape is described in EP 2 130 889 A2. Also in this case, a broad backing layer is provided over a part of its width with a splittable material layer, which is positioned near a longitudinal edge of the backing layer, indicating the leading edge of the splitting tape. The splitting layer is composed of multiple triangularly shaped individual areas of splittable material. These triangles are arranged in such a way that one of their tips is facing the leading edge of the splicing tape.

Without contesting the technical advantages associated with the flying splice tapes known in the art, there is still a need for a flying splice tape having improved characteristics such as e.g. higher resistance to premature splitting and reduced jolting risk.

The unsymmetrical construction of those splicing tapes as previously described in EP 1 355 843 A1, WO 2007/048695 A1 and EP 2 130 889 A2 have indeed several disadvantages. The first drawback is that providing the splittable area near one longitudinal edge of the splitting tape increases the danger of a so called "pre-splitting" of the splittable material. The reason for this is that the area of splittable material is relatively narrow so that it might occur that the splittable materials are already partly separated if the splitting tape is applied to a paper roll and the release liner of the opposite side is removed. The pulling force required to remove the release liner may already exceed the minimum breakout force required to start the separation process of the splittable material.

Furthermore, the unsymmetrical design of such a splittable tape has the further disadvantage that the broader backing layer might bend or flip up during the positioning of the splittable tape during splice pattern preparation. This makes it more difficult to precisely apply splittable tapes correctly in order to avoid an unsuccessful roll change which would necessarily lead to a machine stop, causing significant time delays and incurring expenses to the tape user. The probability of unsuccessful roll changes occurring is increased by the limited time frame the operators have to apply the splicing tapes during machine operation.

SUMMARY OF THE INVENTION

One object of the present invention is to provide an improved splicing tape having a higher resistance to premature splitting or "pre-splitting", which is meant to refer to the tendency to split either during new roll spin-up prior to the instant of splice, or during pattern preparation when the tape is unwound from the roll, or when the protective liners are removed. At the same time jolting, a sudden increase in paper web tension, during the roll change process should be avoided and the splicing tape should be easy to handle and less sensitive to improper handling This objective is achieved with a splicing tape according to the present invention.

According to one aspect, the present invention relates to a splicing tape for continuous roll change, the splicing tape comprising:
a) a first tape component including a first backing layer and a first adhesive layer on a first surface of the first backing layer,
b) a second tape component including a second backing layer and a second adhesive layer on a first surface of the second backing layer and
c) a splitting layer joining the first backing layer and the second backing layer together, such that the first and second adhesive layers are facing away from the splitting layer,
wherein the splitting layer comprises a continuous and uninterrupted middle area extending in the longitudinal direction of the splicing tape and provided with repeating tapered protrusions with flattened tips projecting from the middle area towards both longitudinal edges of the splicing tape.

In another aspect, the present invention is directed to a method of manufacturing a splicing tape for continuous roll change as described above, the method comprising the steps of:
a) providing a first tape component including a first backing layer and a first layer of adhesive;
b) providing a second tape component including a second backing layer and a second layer of adhesive;
c) applying a splitting layer to either one or both of the first and second backing layers, such that the first and second adhesive layers are facing away from the splitting layer; and
d) laminating the first and second tape components together with the splitting layer between the first and second backing layers,
whereby the splitting layer comprises a continuous and uninterrupted middle area extending in the longitudinal direction of the splicing tape and provided with repeating tapered protrusions with flattened tips projecting from the middle area towards both longitudinal edges of the splicing tape.

According to still another aspect, the present invention relates to the use of a splicing tape as described above, for the flying splice of flat-web material wound up to form rolls.

DETAILED DESCRIPTION OF THE INVENTION

Figure 1:
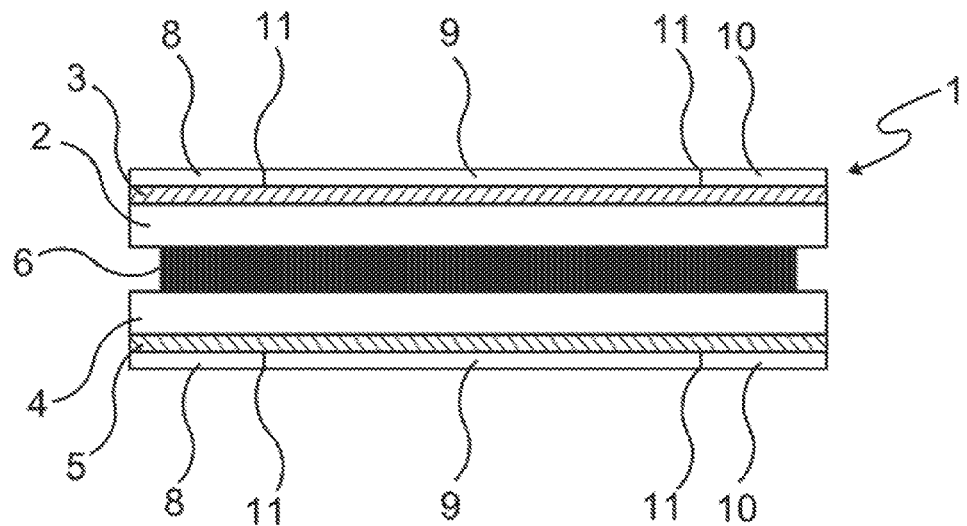
FIG. 1 is a side-sectional view of one embodiment of the splicing tape according to one aspect of the present invention.

According to one aspect, the present invention relates to a splicing tape for continuous roll change, the splicing tape comprising:
a) a first tape component including a first backing layer and a first adhesive layer on a first surface of the first backing layer,
b) a second tape component including a second backing layer and a second adhesive layer on a first surface of the second backing layer and
c) a splitting layer joining the first backing layer and the second backing layer together, such that the first and second adhesive layers are facing away from the splitting layer,
wherein the splitting layer comprises a continuous and uninterrupted middle area extending in the longitudinal direction of the splicing tape and provided with repeating tapered protrusions with flattened tips projecting from the middle area towards both longitudinal edges of the splicing tape.

In other words, the splicing tape according to one aspect of the present invention has a continuous middle area of splitting material, and on both sides of this middle area are multiple portions of splitting material. These multiple portions are directly connected to the middle area and have a reducing width towards the direction of the longitudinal edges of the splicing tape. However, the tips of these portions are not pointy but more flat in order to achieve a higher minimum breakout force to reduce the likelihood of undesired "presplitting" of the splitting layer.

A further advantage of the tape of the present invention is that it can be used from both longitudinal sides. The unsymmetrical splicing tapes known from the prior art comprise the splitting material only along one of the longitudinal edges of the splicing tape and therefore cannot be used from both sides.

It is still a further advantage of the splicing tape according to the invention that the latter is less sensitive to "corner-fold-over". The "corner-fold-over" problem occurs usually with splicing tapes which do not have a continuous and uninterrupted middle layer of splitting material over the whole tape length. As the layer of splitting material connects both backing layers, blank parts between these backing layers allow the backing layers to move independently of each other. At a free end of the tape, for example where the tape has been cut, this lack of connection might lead to a fold-over of one backing layer, so that the splicing tape cannot be fixed properly on the sheet material during the continuous roll change. A lower sensitivity to "corner fold-over" likely leads to better handling of the splicing tape.

The continuous middle layer of splitting material also decreases the potential occurrence of deformation at the connection area. If splicing tapes having portions of separated splittable material as described in EP 2 130 889 A2 are used, air currents can develop between these portions. This is due to the fact that in continuous roll change, the new roll of sheet material is first brought to the rotating speed of the old depleting roll. The rotation speeds are in the area of 40 km/h and very often higher. These high rotating speeds press wind through the blank spots between these splitting portions. The air currents increase in strength as the new roll is brought closer to the old depleting roll, because of the narrowing of the gap between the two rolls. The air currents may deform the sheet material and thereby cause an unsuccessful roll change.

In one preferred aspect of the splicing tape of the present invention, the flattened tips recess from the longitudinal edges of the splicing tape. Preferably, the splitting layer extends over at least 70% of the tape width, more preferably over at least 80%, even more preferably over at least 90% of the tape width. This is advantageous because a wider extent of the splitting material over the tape width reduces the "corner-fold-over" problem explained above.

The continuous and uninterrupted middle area may preferably have a width of at least 10% of the overall width of the splitting layer, more preferably at least 20%, even more preferably at least 30%, still more preferably at least 40%, or even 50%. In another preferred aspect, the width of the middle area is up to 90% of the overall width, preferably up to 80%, more preferably up to 70% of the overall width of the splitting layer.

In yet another preferred aspect of the present invention, the splitting layer is centrically arranged on the longitudinal axis of the splicing tape. The advantage of such an arrangement is that the tape can easily be used from both sides. Such a tape is easier to handle and introduces no additional likelihood of an unsuccessful roll change by applying it from the wrong side.

According to the present invention, the repeating tapered protrusions have flattened tips. The flattened tips can be provided as a straight edge, which may preferably be arranged substantially parallel to the longitudinal edges of the splicing tape.

In the context of the present invention however, the term "flattened tip" is also meant to encompass configurations whereby the tip is bent, so it does not necessarily have to be absolutely straight. The term "bent" is herein understood as preferably meaning that the ratio of the base width of the tip to the height of the tip is at least 1:1, preferably at least 2:1, more preferably at least 5:1, even more preferably at least 10:1. The base width of the flattened tip is understood as the width of the tip at a position in the tapered protrusions, where a drastic change of inclination on both sides of the protrusion is provided.

In one particular aspect of the splicing tape of the invention, the term "flattened tip" is meant to indicate that the tip is (substantially) straight.

In a further preferred aspect of the splicing tape of the invention, on one or preferably on both longitudinal edges of said tape, the ratio of the average width of the flattened tips in the longitudinal direction to the average distance between adjacent flattened tips ranges from 5:1 to 1:5, preferably from 2:1 to 1:2. Such ratios are advantageous because such splicing tapes show an increased minimum breakout force required to start the splitting process. However, on the other hand, jolting during the roll change process which often occurs with splicing tapes having a continuous uninterrupted layer of splitting material is minimized.

The protrusions of the splicing tape according to the invention may exhibit substantially same or different profiles. It is however preferred that both groups of protrusions on each side of the middle area are provided with substantially the same profiles within the respective group. Even more preferably, the profiles of the two groups on both sides of the middle layer are substantially identical.

The protrusions on opposing sides of the middle area may preferably be arranged mirror symmetrically or alternatively, the protrusions on opposing sides of the middle area may be arranged with an offset. The offset can be for example half the width of the protrusion so that the middle access of a protrusion on one side runs through the middle between two protrusions on the opposing side.

Regarding the shapes of the protrusions, numerous possibilities may be used in the context of the present invention. As an example, the side edges of the protrusions may be bent, serrated, concave, convex and/or straight, and have preferably a shape selected from the group consisting of ellipsoidal, semi-circular, sinusoidal, parabolic, hyperbolic and any combinations thereof. The side edges of the protrusions can in general be arranged in such a way that the breakout force begins at the leading edge with a non-zero value to avoid an essentially zero value which would occur with a narrow pointed or sharply rounded curve and gradually and smoothly increases to a known maximum peel value.

Both sides of a particular protrusion may have same or different shapes. From these, ellipsoidal side edges are particularly preferred. The advantage of protrusions with ellipsoidal side edges is that larger areas of the backing layers are connected by the splitting layer material so that the likelihood of the "corner-fold-over" problem is reduced. This is also achieved with semi circular or other convex-shaped side edges of the protrusions.

Preferably still, the first and/or second adhesive layer is uniform along the length of the splicing tape. The adhesives used for the first and second adhesive layers of the splicing tape of the present invention can be the same or different. These adhesive layers may comprise any known adhesive that permanently and strongly adheres to the surface of the sheet material, for which the tape is used. Examples include pressure sensitive adhesives, heat activated adhesives, thermosetting adhesives and remoistenable adhesives.

Particularly preferred adhesives include pressure sensitive adhesives which may be hot-melt adhesives, essentially solvent or water-free adhesives or solvent- or water-based dispersions or solutions. Specific pressure sensitive adhesives include acrylate-based pressure sensitive adhesives, styrene-isoprene block copolymers, acrylic ester-vinyl acetate copolymers, ethylene-vinyl acetate copolymers, plasticized vinyl acetate homopolymers and rubber-latex resin emulsion systems.

In the practice of preferred aspects of the invention, the adhesive compositions of the first and/or second adhesive layer comprises an acrylate-based pressure sensitive adhesive. Acrylate-based pressure sensitive adhesives useful in practicing the invention comprise polymers of one or more monomers of (meth)acrylic acids and optionally other copolymerizable monomers containing functional groups in addition to an ethylenically unsaturated group.

A particularly preferred adhesive for use in the first and second adhesive layers is disclosed in U.S. Pat. No. 7,931,774 B2, the content of which is herewith fully included in the present application by reference.

The acrylate-based pressure sensitive adhesive may comprise conventional additives such as, for example, fillers, anti-oxidants, flame-retardants, pigments, plasticizers or polymer additives. By varying the nature and amount of the monomers and the nature and amount of the additives, the cohesive properties of the resulting adhesive can be changed as known in the art.

Examples of acrylate-based pressure sensitive adhesives which are suitable in the practice of the invention are described in Satas, "Acrylic Adhesives, Handbook of Pressure-Sensitive Adhesive Technology", 2nd ed., pp. 396-456 (D. Satas, ed.), Van Nostrand Reinhold, New York (1989).

A particularly suitable acrylate based pressure sensitive adhesive includes copolymers of an acrylic or methacrylic acid and an alkyl acrylate or methacrylate wherein the alkyl group has at least 4 carbon atoms, typically 4 to 14 carbon atoms. Examples of such alkyl acrylates or methacrylates include, but are not limited to, n-butyl, n-pentyl, n-hexyl, cyclohexyl, isoheptyl, n-nonyl, n-decyl, isohexyl, isobornyl, 2-ethyloctyl, isooctyl, 2-ethylhexyl acrylates and methacrylates, and any combinations or mixtures thereof.

Preferred alkyl acrylates include isooctyl acrylate, 2-ethylhexyl acrylate, n-butylacrylate, cyclohexyl acrylate, and any combinations or mixtures thereof. A particularly preferred alkyl acrylate is isooctyl acrylate. Particularly preferred alkyl methacrylates include butyl methacrylate, cyclohexyl methacrylate, and isobornyl methacrylate.

A preferred repulpable adhesive for use in the present invention has a rating of no more than 3 in the European repulpability test described in U.S. Pat. No. 5,380,779 A1. Examples of repulpable adhesives for use in the invention include the repulpable adhesives disclosed in the following references: U.S. Pat. Nos. 5,380,779 A1; 4,413,080 A1; 4,569,960 A1; 4,482,675 A1; 4,388,432 A1; 5,102,733 A1; and 5,125,995 A1.

The thicknesses of the adhesive layers can be varied widely but are typically independent of each other and are typically between 15 µm and 60 µm, preferably between 20 and 40 µm.

According to another preferred aspect of the splicing tape of the present invention, the material of the splitting layer is chosen from the group consisting of splittable paper, adhesives, splittable films, UV cured layers, electrostatically adhered surfaces—layers bonded via Van der Waals forces or other similar forces, and any combinations or mixtures thereof. The splitting of the tape can be achieved by adhesive or cohesive failure of the splitting layer—or by application of any force such that the forces holding the splitting layer together are exceeded, and the splitting layer thereby is separated into its component parts.

The splitting layer is typically selected to provide the desired breakout force, with regard to the materials used for the backings and barrier layers, if present. Preferably, the splitting layer is an adhesive, i.e. a third adhesive layer. Preferably, the adhesive used is repulpable. Suitable adhesives may be selected from those described above as being preferable for use as the first and second adhesive layers of the first and second tape components. Preferred adhesives include synthetic resin emulsion based adhesives, and water-based adhesives such as e.g. PVA-based adhesives. Other suitable adhesives for use as a splitting layer include those disclosed in U.S. Pat. No. 7,931,774 B2, the content of which is herewith fully incorporated by reference.

It is most preferred that, if an adhesive is used for the splitting layer, the adhesive does not have pressure sensitive properties, in particular at room temperature, in order to avoid a sticky surface after a cohesive or adhesive separation of the splitting layer. By room temperature, it is meant herein to refer to a temperature typically between 10° C. and 50° C., more typically between 15° C. and 27° C.

The type and/or coating weight of the adhesive layer used as the splitting layer (also referred to herein as the third adhesive layer) can also be varied to control the breakout force between the first and second tape components of the splicing tape. For many applications, increasing the coating weight of the third adhesive layer will increase the breakout force. In one preferred aspect, the third adhesive layer is applied with an anilox coating roll. The theoretical coating volume of the anilox coating roll is determined from the size of the cells which apply the adhesive. By increasing the theoretical volume, the coating weight of third adhesive is increased.

Controlling the nip pressure when the first and second tape components are laminated together can also be done to control the breakout force and peel force. In many applications, increasing the nip pressure will increase the bond strength between the first and second tape components, thereby increasing the breakout force and peel force.

With respect to the backing material, the first and second backing layers can be the same or different, and are preferably the same. Backings may comprise, any material commonly used for backings of tapes and includes paper layers as well as plastic films. Suitable backings include, but are not limited to, polyethylene films, polypropylene films, polyester films, polyethylene or polypropylene coated papers, Kraft papers, non-woven materials and any combinations or mixtures thereof.

In one further preferred aspect of the splicing tape according to the invention, the first and second backing layers comprise repulpable backings. More preferably, the first and second backing layer comprises cellulosic backings. Most preferably, the first and second backing layers comprise paper backings. In case paper is used as first or second backing layer, it is preferred to use smooth papers of low porosity. Paper backings are preferred because of their repulpability.

One suitable backing material for use herein is a white, repulpable 31 g/m² paper backing. The thicknesses of the first and second backing layers are independent of each other. Typically, the backing thickness ranges between 20 µm and 150 µm, preferably between 30 µm and 80 µm.

According to another preferred aspect of the splicing tape according to the invention, the first and/or second backing layer are provided with a barrier layer, designed to prevent significant penetration of an adhesive into the first and/or second backing layers. This is especially useful, if the splitting layer is or comprises an adhesive. The penetration can for example be prevented by covering at least one of said barrier layers on one or both sides with a lacquer.

Suitable barrier layers for use herein may be selected with regard to the material of the backings and with regard to the splitting layer to provide the desired breakout force. The barrier layer should be chosen so as to prevent the adhesive layers from penetrating significantly into the backings, particularly when the backings comprise repulpable backings such as paper or other cellulosic backings. The barrier layer also preferably provides a smooth, continuous surface onto which the splitting layer can be applied. If the adhesive penetrates significantly into the backings, this could provide such a strong bond between the first and second tape backings that the resulting breakout force and peel force of the splicing tape are undesirably high.

Suitable barrier layers for use herein are preferably selected such that the splicing tape is repulpable, especially when the splicing tape is to be used in paper splicing applications in which repulpability is desired or required. In one preferred aspect, the barrier layers comprise a lacquer, such as a UV curable lacquer.

Either one or both barrier layers may be a filled layer so as to include a release material such as a silicone or fluorine containing material. Particularly suitable materials are silicone-containing materials. By varying the amount of silicone in either one or both barrier layers, the force required for delaminating the splicing tape between either one or both barrier layers and the third adhesive layer can be adjusted as desired. Also, varying the coating weight of either one or both barrier layers may be done to achieve the desired breakout force, by using anilox coating rollers of varying theoretical volume.

In some applications, it is desirable to decrease the breakout force and peel force when measured across the width of the splicing tape to make it easier to initiate and complete separation of the first and second components during the flying splice operation. However, it may be desirable to lower the cross direction breakout force and peel force while maintaining the lengthwise breakout force and peel force. Maintaining a high breakout force and peel force in the direction along the length of the splicing tape allows the tape to be conveniently wound in roll form without prematurely separating the first and second portions. In one preferred aspect, the first barrier layer or second barrier layer may be omitted, more preferably the first barrier layer is omitted. It has been observed that for certain constructions, removing the first barrier layer can significantly reduce the cross direction breakout and peel force, from about 100-120 g/25 mm down to about 33-40 g/25 mm; while maintaining the lengthwise breakout and peel force substantially unaffected, at about 33-35 g/25 mm.

In a preferred aspect, the barrier layers and the splitting layer are selected such (that) the splicing tape, after making the splice and separating into the first tape component and second tape component, present surfaces that are printable and/or coatable, as desired for the particular application of the splicing tape.

In another aspect, a release liner is provided on at least one of the first and second adhesive layers for storage and protection. The release liner can be selected from a number of known and available papers or films having a release material coated onto one side of the splicing tape or on both sides in case of a splicing tape in the form of a roll. The base web of the release liner may be selected from kraft papers, super-calendered kraft papers, clay-coated kraft papers, glassines, parchments, and other papers and films which have a suitable undercoating which holds the release coating.

The release coating for use herein may be any of the known materials used for their release properties for adhesives. Preferred types are silicones and modified silicones, the modification including both co-polymerisations of silicones with other non-release chemical agents or by adding non-silicone materials to the silicone coating solution prior to the application to the release base paper. Other release agents such as polyethylene, fluorocarbons, the Werner type chromium complexes and polyvinyl octadecyl carbamate may also be used. The choice of release coating is dependent on the tack, adhesion level and chemical nature of the adhesive layer. The release liner is chosen such that when it is removed from the splicing tape, no premature separation takes place between the first and second tape components.

In a preferred aspect, the release liner is a split release liner, including a first portion and a second portion, wherein said release liner comprises a first portion and a second portion, each being independently separable from the splicing tape. This allows for conveniently exposing a portion of first adhesive layer along the length of the splicing tape for adhering the leading edge portion of the outer turn of a new roll of material to only that exposed portion of the first adhesive layer. The second portion of the release liner may remain in place to prevent inadvertent adhesion of material to the outer portion of the first layer of adhesive prior to splicing the new roll to the depleting web. When it is close to the time for forming the splice, a second portion of the release liner may be removed.

If the splicing tape is provided in roll form, a release liner having release properties on both surfaces is preferred. The splicing tape according to the present invention can also be provided in the form of sheets and is then preferably protected by two release liners provided on both surfaces of the roll.

In another preferred aspect, the release liner for use herein may comprise a first portion, a second portion, and a third portion, wherein the first portion extends along the length of the splicing tape adjacent a first longitudinal edge of the splicing tape, the third portion extends along the length of the splicing tape adjacent a second longitudinal edge of the splicing tape, and the second portion extends along the length of the splicing tape between the first and third portions; and wherein the second portion of the splicing tape includes a plurality of weakened or separated lines extending down the length of the second portion.

As already set out above, the profiles of the protrusions of the splitting layer provide an increased and definable minimum breakout force, which can for example be adjusted by the material of the splitting layer as well as by the ratio of the average length of the flattened tips in the longitudinal direction to the average distance between adjacent flattened tips. It is further preferred, that the splicing tape according to the invention has a minimum breakout force of at least 10 g/25 $mm_{width}$ of the tape (when measured according to the test method described in the experimental section), preferably at least 15 g/25 $mm_{width}$ of the tape. It has been found that such a minimum breakout force is preferably met while trying to avoid jolting during the roll change on the one hand and to avoid "pre-splitting" of the splicing tape during splice preparation and roll spin-up on the other.

The components of the splicing tape according to the invention are preferably chosen so that the tape is repulpable. In particular, the backings, adhesive, and barrier coat materials are preferably chosen so that the splicing tape is repulpable. More preferably, the components are selected so that the splicing tape passes a TAPPI UM 213 Procedure A test.

According to another aspect, the present invention relates to a method of manufacturing a splicing tape for continuous roll change, the method comprising the steps of:
a) providing a first tape component including a first backing and a first layer of adhesive;
b) providing a second tape component including a second backing and a second layer of adhesive;
c) applying a splitting layer to either or both of the first and second backing layers, such that the first and second adhesive layers are facing away from the splitting layer; and
d) laminating the first and second tape components together with the splitting layer between the first and second backing layers,
whereby the splitting layer comprises a continuous and uninterrupted middle area extending in the longitudinal direction of the splicing tape, and provided with repeating tapered protrusions with flattened tips projecting from said middle area towards both longitudinal edges of the splicing tape.

The tapes of the present invention can be produced by any known method suitable to produce multi-layered tape constructions. One preferred method of making the splicing tape according to the present invention is as follows: First and second tape components may be initially provided as separate, complete articles, with or without barrier layers already present on the backing layers. Suitable examples of commercially available tapes that could be used as first and/or second tape components, include repulpable tapes available under the trade designation 9969 tape from 3M Company.

The backing side of the second tape component may be coated with a barrier layer using an anilox coating roller. The thickness of the applied barrier layer can be controlled by selecting an anilox roller with a desired theoretical volume. In a preferred embodiment, the barrier layer is a UV curable lacquer that is cured using a 3 kW mercury vapour bulb.

The release liner on the first tape component can be slit to form first and second portions. The liner may also be slit to form a third portion, if desired. Further, perforations may be formed in the second portion of the liner, if desired. The backing side of the first tape component may be coated with a barrier layer, for those embodiments in which a first barrier layer is to be included. As for the second tape component the barrier layer can be applied using an anilox coating roller with a desired theoretical volume.

In a preferred aspect the curing of the UV curable lacquer providing the first barrier layer may be done using a 3 kW mercury vapour bulb. The splitting layer may be provided in the form of a third adhesive layer and may then be coated onto the backing of either tape component.

In another preferred aspect, the splitting layer, which is preferably a third adhesive layer is coated onto the first barrier layer of the first tape component using a printing roller which provides for the protrusion shape and to which the third adhesive is transferred via an anilox coating roller with a desired theoretical volume. The first and second tape components may then be laminated together such that the third adhesive layer separably bonds the components together.

Preferably, the preparation of the first and second tape components for lamination into a splicing tape are carried out simultaneously or alternatively in sequence. Furthermore, it is not necessary that the tape components be provided as separate, finished articles themselves. The components may be manufactured immediately prior to final assembly of the splicing tape.

With the benefit of the teachings of the present application, a person skilled in the art can select suitable materials for the various components of the splicing tape to provide a desired breakout force and peel force between the first and second tape components. For example, the bond strength between the first adhesive layer and the spliced portions of the web should be greater than the breakout force required to separate the components of the splicing tape in use. Similarly, the bond strength between the second adhesive layer and the outer surface of the next to last turn of the new roll should be greater than the break-out force required to separate the components of the splicing tape in use. In other words, both bond strengths should be greater than the breakout and peel forces.

The splitting of the tape may be achieved by adhesive or cohesive failure of the splitting layer, backing delamination or any combinations thereof. If it is desired to separate the splicing tape by cohesive separation of the splitting layer, then the cohesive strength and the geometric design of the splitting layer will define the breakout force and peel force of the splicing tape. In this execution, the bond strength between the first backing layer and the splitting layer should be greater than the cohesive strength of the splitting layer. Similarly, the bond strength between second backing layer and the splitting layer should be greater than the cohesive strength of the splitting layer. In other words, both bond strengths should be greater than the cohesive strength of the splitting layer.

If it is desired that the splicing tape delaminate between the first backing layer and the splitting layer, such that the splitting layer substantially remains on the second tape component, then the following conditions should be met. The bond strength between the first backing layer and the splitting layer should be less than both the cohesive strength of the splitting layer and the bond strength between the second backing layer and the splitting layer.

Alternatively, if it is desired that the splicing tape delaminate between the second backing layer and the splitting layer, such that the splitting layer substantially remains on the first tape component, then the following conditions should be met. The bond strength between the second backing layer and the splitting layer should be less than both the cohesive strength and the bond strength between the first backing layer and the splitting layer.

In a preferred aspect, the splitting of the tape is achieved by cohesive failure of the splitting layer as described above.

Figure 10:
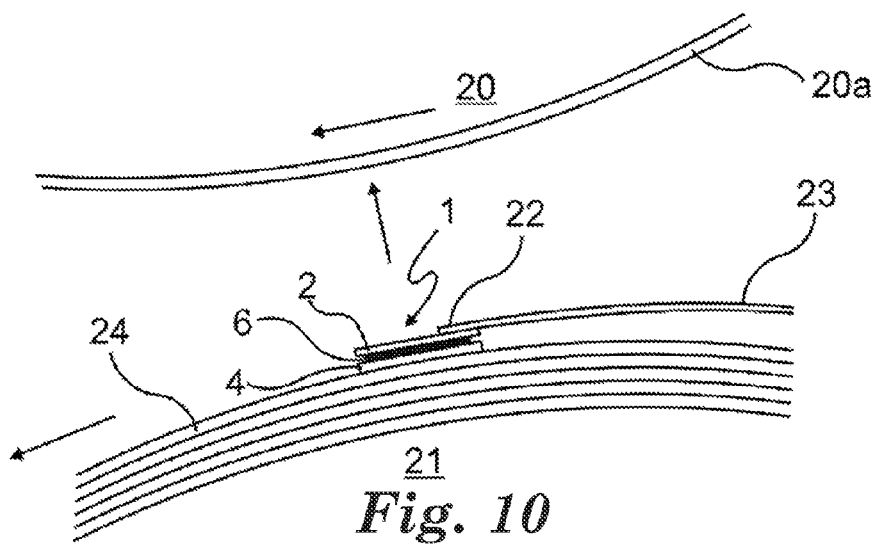
FIGS. 10 and 11 schematically represent a splicing process using a splicing tape according to the present invention in a continuous roll change process.
Figure 11:
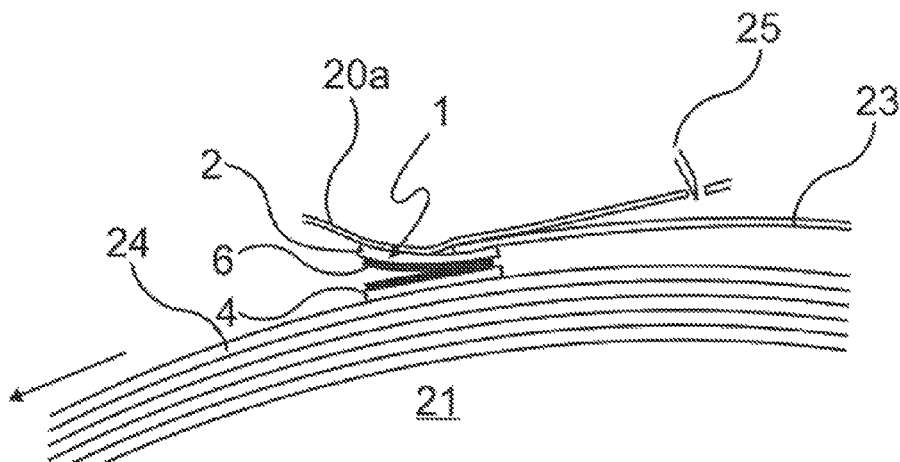

According to still another aspect, the present invention relates to the use of a splicing tape as described above, for the continuous roll change of flat-web material wound up to form rolls. Suitable methods of using the splicing tape of the invention for making a continuous roll change between a depleting roll of flat-web material and a new roll of flat-web material will be easily identified by those skilled in the art of splicing tapes. Any conventional static or dynamic splicing methods may be used in the context of the present invention. Preferably, the splicing tape of the invention is used in a flying splice method. Such a preferred splicing operation is illustrated in FIGS. 10 and 11. The present invention will be further explained with reference to the appended figures.

In FIG. 1, a side-sectional view of one embodiment of the splicing tape 1 for continuous roll change is presented. The splicing tape 1 comprises a first tape component including a first backing layer 2 and a first adhesive layer 3 on a first surface of the first backing layer 2. The splicing tape 1 further comprises a second tape component including a second backing layer 4 and a second adhesive layer 5 on a first surface of the second backing layer 4. The adhesive used for the first and second adhesive layers 3, 5 is preferably an adhesive as disclosed in U.S. Pat. No. 7,931,774 B2.

Furthermore, the splicing tape 1 of the invention further comprises a splitting layer 6 joining the first backing layer 2 and the second backing layer 4 together, such that first and second adhesive layers 3, 5 are facing away from the splitting layer 6. In other words, the splitting layer 6 is interposed between the first and second backing layers 2, 4.

The first and second adhesive layers 3, 5 are chosen from acrylate adhesives and provided with release liners, which comprise each a first portion 8, a second portion 9 and a third portion 10 extending along the length of the splicing tape 1. The portions 8, 9, 10 of the release liner are separated from each other by score lines 11 extending along the length of the splicing tape 1 adjacent to the first and second longitudinal edges of the splicing tape 1.

Figure 2:
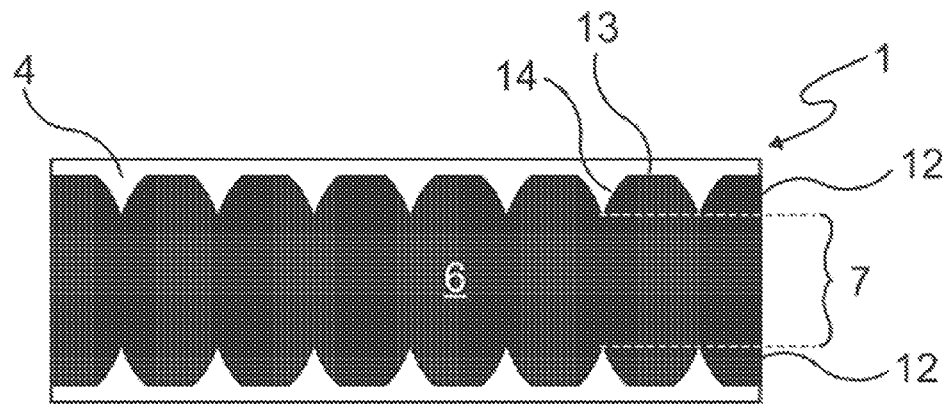
FIG. 2 is a top view of one embodiment of the splicing tape according to one aspect of the present invention.

FIG. 2 represents a top view of one embodiment of the splicing tape 1 in which the upper backing layer 2 is removed in order to allow a free view of the profile of the splitting layer 6. The splitting layer 6 comprises a continuous and uninterrupted middle area 7 extending in the longitudinal direction of the splicing tape 1. From the middle area 7, tapered protrusions 12 with flattened tips 13 project towards both longitudinal edges of the splicing tape 1 in a repeating manner. The protrusions 12 have substantially identical profiles on both sides of the middle area 7, in the current example, a convex profile with ellipsoid side edges 14 is shown.

Figure 3:
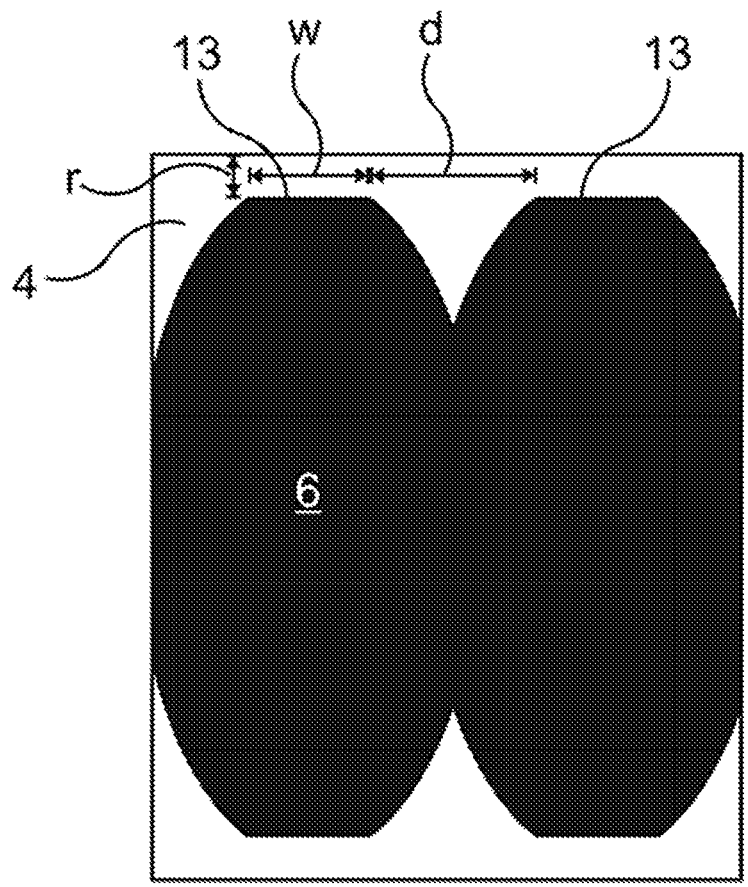
FIG. 3 is a magnified section of the splicing tape of FIG. 2.

FIG. 3 shows an enlarged portion of the splicing tape 1 shown in FIG. 2. As can be seen in FIG. 3, the flattened tips 13 have a recess (r) from the longitudinal edges of the splicing tape 1. Furthermore, flattened tips 13 have a width (w) and are arranged in a distance (d) from each other, so that in the current example, a ratio of the average width of the flattened tips 13 in the longitudinal direction to the average distance between adjacent flattened tips 13 is about 1:1.5.

Figure 4:
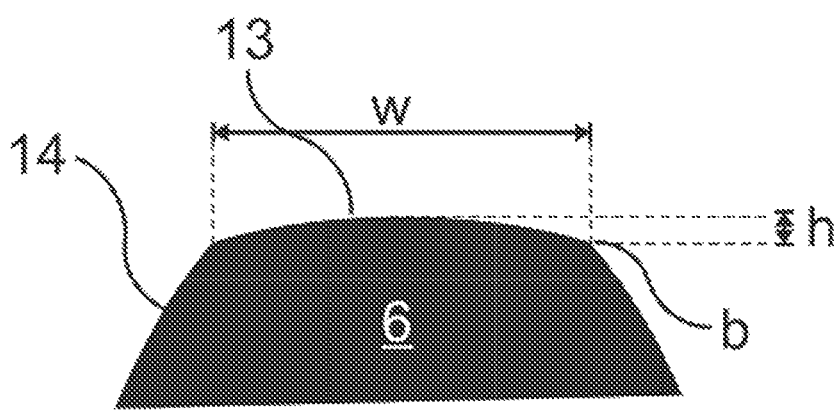
FIG. 4 is a magnified section of the tip area of a protrusion as represented in FIG. 3.
Figure 5:
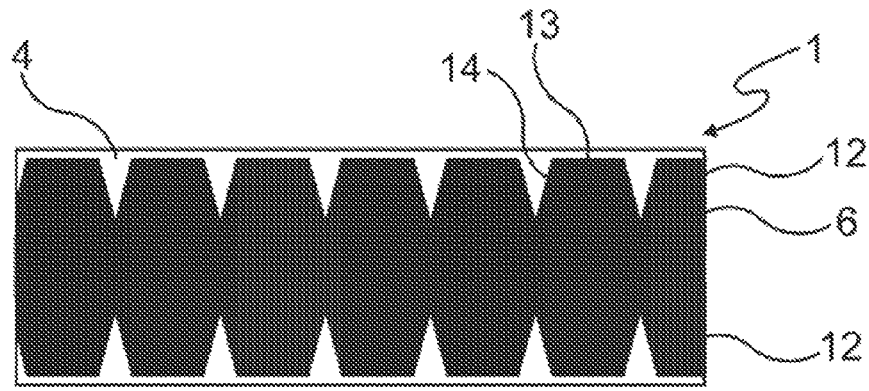
FIGS. 5 to 9 represent alternative embodiments of the splicing tape according to one aspect of the present invention.
Figure 6:
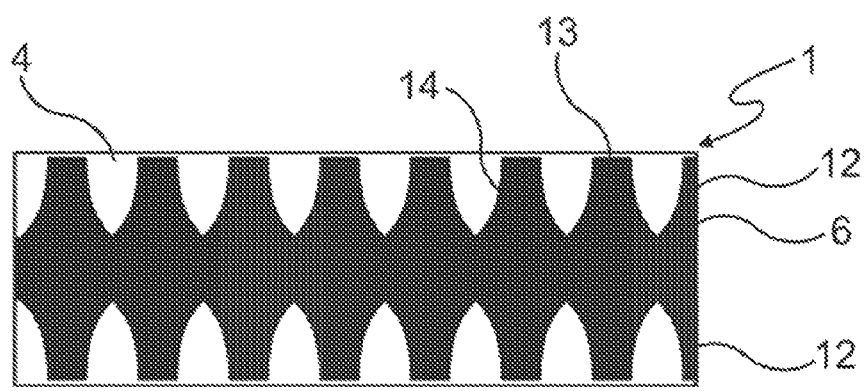

In FIG. 4, an enlarged picture of an alternatively flattened tip 13 is shown. In this example, the flattened tip 13 is slightly bent. From a baseline (b) of the flattened tip 13, which is defined by the drastic change of inclination of the side edges 14 of the protrusion 12, the middle of the tip 13 has a height (h). In the current case, the ratio of the base width b of the tip 13 to the height (h) of the tip 13 is about 20:1. FIGS. 5 to 9 show alternative embodiments of the splicing tape 1. In FIG. 5, the protrusions have linear side edges 14, whereas the side edges 14 of the tape 1 in FIG. 6 are concave.

Figure 7:
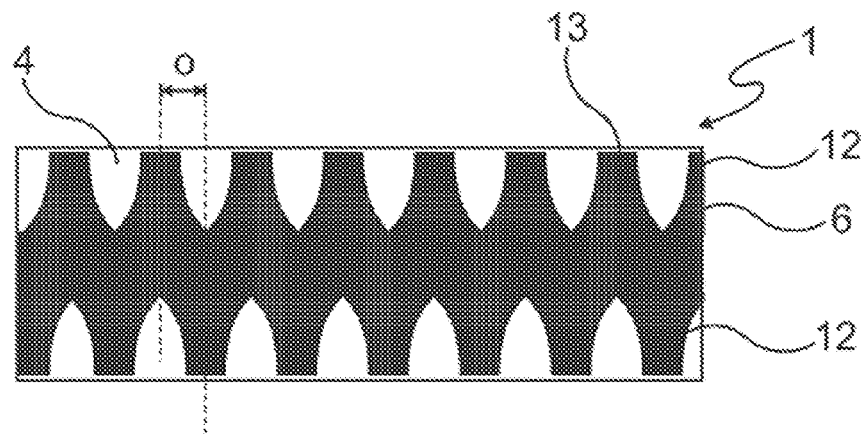

In FIG. 7, another alternative embodiment is shown, in which the protrusions 12 on opposite sides of the middle area 7 are arranged in an offset (o) such that the centre line of a protrusion 12 on one side runs through the middle of two adjacent protrusions 12 on the opposite side. The offset (o) can have any value and is not limited to the embodiment shown in FIG. 7. Also, the offset can be combined with any shape of protrusions and is not to be understood as limiting to concave protrusions 12 as shown in the present figure.

Figure 8:
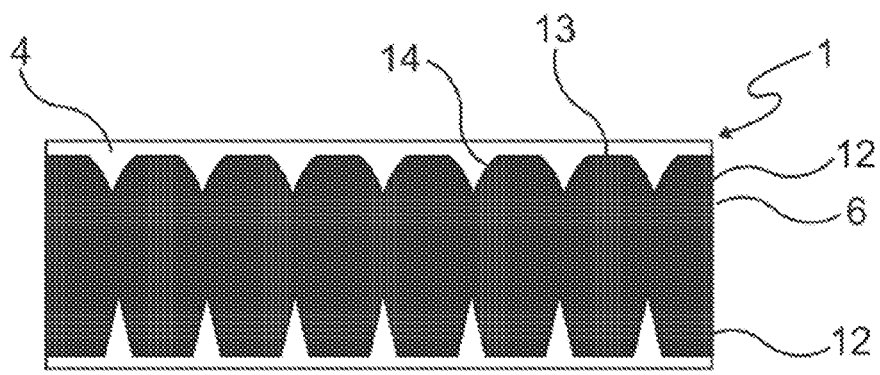

In FIG. 8, a further alternative embodiment of the splicing tape 1 is presented. In this case, the protrusions 12 on one side of the middle area 7 have a convex shape whereas on the opposing side, the protrusions 12 have linear side edges 14.

Figure 9:
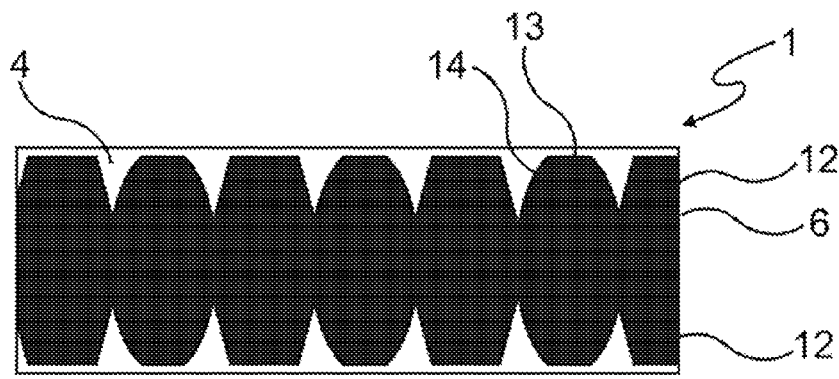

FIG. 9 shows another alternative embodiment of the splicing tape 1 of the invention, in which pairs of opposing protrusions 12 have linear side edges and convex side edges 14, whereas these different shapes are arranged in an alternating manner.

In FIGS. 10 and 11, a method of using the splicing tape 1 of the invention for making a continuous roll change between a depleting roll of sheet material 20 and a new roll of sheet material 21 is illustrated. FIG. 10 shows the start of the process. A leading edge portion 22 of the outer turn 23 of the new roll 21 is lifted and the splicing tape 1 is attached with its lower backing layer 4 to the following turn of sheet material 24. The adhesive layers are not indicated for reasons of simplicity.

The leading edge portion 22 is attached to a part of the upper backing layer 2 of the splicing tape 1. The further area of the upper backing layer 2 or the respective adhesive layer 3 remains exposed so that the surface of the sheet material of the depleting roll 20 can adhere to this area. In order to perform the roll change, the new roll 21 is moved towards a surface of the depleting roll 20 until the sheet material of the depleting roll 20 comes into contact with the exposed adhesive layer of the splicing tape 1.

The splicing process is illustrated in FIG. 11. To make the splice, the new roll 21 is rotated about its longitudinal symmetry axis and brought to a peripheral speed commensurate with the linear speed of the running web sheet of the depleting roll 20. In an appropriate moment when the depleting roll is close to expiration and the leading edge 22 of the new roll 21 is in an appropriate rotational position relative to the running web sheet of the depleting roll 20, the running web of the depleting roll 20 is moved, for example by means of a roller, towards the leading edge portion 22 of the outer turn 23 of the new roll 21 so that the running web of the depleting roll is adhered to the remaining exposed surface of the upper adhesive layer of the splicing tape 1.

The running web sheet 20a of the depleting roll 20 and the rotating new roll 21 together exert a peeling force to the splicing tape 1 as shown in FIG. 11. This causes the first and second tape components of the splicing tape 1 to separate. Separation initiates at a first, forward edge of the splicing tape 1 and progresses along the width of the splicing tape 1 to a second, rear edge of the splicing tape 1. Upon separation of the tape components of the splicing tape 1, the second backing layer 4 remains adhered by the second adhesive layer 5 to the upper surface of the next-to-the-outer turn 24 and the first backing layer 2 remains adhered by the first adhesive layer 3 to the splice between the outer turn 23 of the new roll 21 and the running web sheet 20a of the depleting roll 20. During or after the instant the splice of the splicing tape 1 is made, the depleting roll 20 and the new roll 21 are separated by cutting the sheet material 20a with a knife 25.

In FIGS. 12 to 16, the splitting force dependent on the shape of the splitting layer is presented. In the diagrams, the splitting force is recorded over the width of the tape from one longitudinal edge across to the other longitudinal edge. As set out above, the splitting process can be divided into an initial phase, in which the breakout force is to be applied to start the splitting process and a successive peel phase for continuing the splitting.

Item 1 is a splicing tape (1) for continuous roll change, the splicing tape comprising:
  a) a first tape component including a first backing layer (2) and a first adhesive layer (3) on a first surface of the first backing layer (2),
  b) a second tape component including a second backing layer (4) and a second adhesive layer (5) on a first surface of the second backing layer (4) and
  c) a splitting layer (6) joining the first backing layer (2) and the second backing layer (4) together, such that the first and second adhesive layers (3, 5) are facing away from the splitting layer (6), wherein the splitting layer (6) comprises a continuous and uninterrupted middle area (7) extending in the longitudinal direction of the splicing tape and provided with repeating tapered protrusions (12) with flattened tips (13) projecting from the middle area (7) towards both longitudinal edges of the splicing tape (1).

Item 2 is the splicing tape according to item 1, wherein the flattened tips (13) recess from the longitudinal edges of the splicing tape (1).

Item 3 is the splicing tape according to any of item 1 or 2, wherein the splitting layer (6) extends over at least 70% of the tape width, preferably at least 80% of the tape width and most preferably at least 90% of the tape width.

Item 4 is the splicing tape according to any of the preceding items, wherein the splitting layer (6) is centrically arranged on the longitudinal axis of the splicing tape (1).

Item 5 is the splicing tape according to any of the preceding items, wherein the flattened tip (13) has a straight edge, which is preferably arranged substantially parallel to the longitudinal edges of the splicing tape (1).

Item 6 is the splicing tape according to any of items 1 to 4, wherein the flattened tip (13) is bent so that the ratio of the base width (w) of the tip (13) to the height (h) of the tip (13) is at least 1:1, preferably at least 2:1, more preferably at least 5:1, even more preferably at least 10:1.

Item 7 is the splicing tape according to any of the preceding items, wherein on one or preferably on both longitudinal edges of the tape, the ratio of the average width (w) of the flattened tips (13) in the longitudinal direction to the average distance (d) between adjacent flattened tips (13) ranges from 10:1 to 1:10, preferably from 5:1 to 1:5.

Item 8 is the splicing tape according to any of the preceding items, wherein the repeating tapered protrusions (12) exhibit substantially same or different profiles, wherein the profiles are preferably substantially identical on each side of the middle area, preferably on both sides of the middle area.

Item 9 is the splicing tape according to any of the preceding items, wherein the repeating tapered protrusions (12) on opposing sides of the middle area (7) are arranged mirror symmetrically.

Item 10 is the splicing tape according to any of items 1 to 8, wherein the repeating tapered protrusions (12) on opposing sides of the middle area (7) are arranged offset.

Item 11 is the splicing tape according to any of the preceding items, wherein the side edges of the repeating tapered protrusions (12) are bent, serrated, concave, convex and/or straight, and have preferably a shape selected from the group consisting of ellipsoidal, semi-circular, sinusoidal, parabolic, hyperbolic, and any combinations thereof.

Item 12 is the splicing tape according to any of the preceding items, wherein the material of the splitting layer (6) is chosen from the group consisting of splittable paper, adhesives, splittable films, UV cured layers, electrostatically adhered surfaces—layers bonded via Van der Waals forces or other similar forces, and any combinations thereof. Preferably, the material of the splitting layer (6) is chosen from an adhesive.

Item 13 is the splicing tape according to any of the preceding claims, wherein the first and second backing layers (2, 4) comprise a repulpable backing material.

Item 14 is the splicing tape according to any of the preceding items, wherein the first and second backing layers (2, 4) comprise cellulosic backing layers.

Item 15 is the splicing tape according to any of the preceding items, wherein the first and second backing layers (2, 4) comprise paper backing layers.

Item 16 is the splicing tape according to any of the preceding items, wherein a barrier layer is comprised between the splitting layer (6) and at least one of the first and second backing layers (2,4).

Item 17 is the splicing tape according to item 16, wherein the barrier layer comprises a lacquer.

Item 18 is the splicing tape according to any of item 16 or 17, wherein the barrier layer comprises a UV curable barrier layer.

Item 19 is the splicing tape according to any of the preceding items, wherein the splitting layer (6) comprises a water-based adhesive.

Item 20 is the splicing tape according to any of the preceding items, wherein the splitting layer (6) comprises a synthetic resin emulsion-based adhesive.

Item 21 is the splicing tape according to any of the preceding items, which in use separates by cohesive separation of the splitting layer (6).

Item 22 is the splicing tape according to any of the preceding items, which in use separates by delamination between the splitting layer (6) and either of the first and second backing layers (2,4).

Item 23 is the splicing tape according to any of the preceding items, wherein a release liner is provided on at least one of the first and second adhesive layers, wherein the release liner comprises a first portion (8) and a second portion (9), each being independently separable from the splicing tape (1).

Item 24 is the splicing tape according to any of the preceding items, wherein the release liner comprises a first portion (8), a second portion (9), and a third portion (10), wherein the first portion (8) extends along the length of the splicing tape (1) adjacent to a first longitudinal edge of the splicing tape (1), the third portion (10) extends along the length of the splicing tape (1) adjacent to a second longitudinal edge of the splicing tape (1), and the second portion (9) extends along the length of the splicing tape (1) between the first and third portions (8, 10), and wherein the second portion (9) of the splicing tape (1) includes a plurality of scored or perforated lines extending across the length of the second portion.

Item 25 is the splicing tape according to any of the preceding items, wherein the splicing tape (1) has a minimum breakout force of at least 10 g/25 $mm_{width}$ of the tape when measured according to the test method described in the experimental section.

Item 26 is a method of manufacturing a splicing tape (1) for continuous roll change, said method comprising the steps of:
 a) providing a first tape component including a first backing layer (2) and a first layer of adhesive (3);
 b) providing a second tape component including a second backing layer (4) and a second layer of adhesive (5);
 c) applying a splitting layer (6) to either one or both of the first and second backing layers (2, 4), such that the first and second adhesive layers (3, 5) are facing away from the splitting layer (6); and
 d) laminating the first and second tape components together with the splitting layer (6) between the first and second backing layers (2, 4),
whereby the splitting layer (6) comprises a continuous and uninterrupted middle area (7) extending in the longitudinal direction of the splicing tape (1), and provided with repeating tapered protrusions (12) with flattened tips (13) projecting from the middle area (7) towards both longitudinal edges of the splicing tape (1).

Item 27 is the use of a splicing tape according to any of the preceding items, for the continuous roll change of flat-web material wound up to form rolls.

EXAMPLES

Sample Preparation:

As testing sample, the tape commercially available under tradename "3M Scotch™ Splittable Flying Splice Tape Repulpable R9996 (75 mm tape width)" is used.

Sample 1 (comparative): One section of the tape is cut into rectangular pieces of 25 mm×75 mm, and used later to test 5 rectangles for 5 test sheets. The 75 mm long dimension of each rectangle corresponds to the width of the tape so that later testing of breakout and peel forces is done across the width of the tape.

Sample 2 (according to the invention): From a second section of the same tape, Ellipse patterns are cut. Each ellipse has a short axis of 25 mm, and a long axis of 70 mm when measured to the flat leading edge of the ellipse. The flat tips of each ellipse shape are taken to be the recessed edge of the original tape 2.5 mm in from the longitudinal tape edge. Then the ellipses are cut in a straight line one from another 5 ellipses for 5 test sheets. Each ellipse measures 25 mm across (short axis)×70 mm long (long axis—flat edge to flat edge). The leading flat edge measures about 8-10 mm across.

Sample 3 (comparative): From a third section of the same tape, Ellipse patterns are cut. Each ellipse has a short axis of 25 mm, and a long axis of 70 mm when measured to the rounded tip of the ellipse. The round tips of each ellipse shape are located at the recessed edge of the original tape 2.5 mm in from the longitudinal tape edge. Then the ellipses are cut in a straight line one from another 5 ellipses for 5 test sheets. Each ellipse measures 25 mm (short axis)×70 mm (long axis—tip to tip).

Sample 4 (comparative): Finally, from unused samples from section 3, are cut Ellipse patterns. Each ellipse has a long axis of 70 mm when measured to the rounded tips of the ellipse, and a short axis (narrow portion only when extrapolated (see dashed line) of about 10 mm. The round tips of each ellipse shape are located at the recessed edge of the original tape 2.5 mm in from the longitudinal tape edge. 5 ellipses are thus prepared for 5 test sheets. The tip of the narrow portion of the ellipse is used as the leading edge in all testing for this section.

Test Method for Measuring the Splitting Force:

For each of the 4 sample groups above, testing is carried out as follows:

Each test sheet is adhered onto a clean Aluminum test panel and allowed to climatize to 23° C. and 50% RH for 24 hours. Then the liner is removed from the top layer of each test sheet to expose the splicing side adhesive. The leading edge of each panel is taken to be the end farther away from the score line in the protective liner. In the case of sample 4—narrow ellipse, the narrow end is taken to be the leading edge.

To each test sheet, a piece of 80 g/sqm uncoated printing paper (30 mm×150 mm) is adhered so that the long end extends beyond the leading end of the test sheet.

The A1 test panel is fixed in a horizontal position to a Zwick Z-005 tensile tester (Load cell 1-10N) while the end of paper strip is inserted into the jaws of the tensile tester (head 0-10N). The tester is set to record a minimum splitting force (90° peel mode) of 0.01 N. During the testing, the paper strip is pulled in a direction perpendicular to the plane of the Al panel, so that the splittable test sheet between paper strip and A1 panel is split at a speed of 300 mm/min and at a 90° angle, as described in test method procedure ASTM D-3330 (F). The A1 panel is set to move at the same speed so that the pulling angle of 90° is maintained throughout the test.

The force required to split the test sheet as described above is recorded in Newtons.

For each set of 5 test sheets, 5 graphs are recorded. An average curve is then generated for each set of 5 samples resultant average graph shown in FIGS. 12 to 15. The splitting force recorded at 4 mm is taken as reference point to estimate the breakout force.

Experimental Results:

The splittable splicing tape of the invention performs at least two combined functions during the execution of a roll change. The first function is to hold the new roll together during both splice preparation and during spin-up at 40 km/hour (often at higher speeds), as the expiring web and new roll are allowed to reach equivalent speeds. The ability to perform this function is measured by "breakout force" (BOF) here taken to be the splitting force measured at 4 mm in from the leading edge of the splicing tape. Very low breakout forces can lead to a high risk of "pre-splitting" of the tape, either during splice preparation, or during roll spin-up before the actual splice takes place, giving rise to an increased risk of unsuccessful roll changes.

The second function performed by the splicing tape of the invention is to smoothly separate at the instant of splicing, without causing a sudden increase in the web tension of the expiring web (herein referred to as "jolting"). A high risk of "jolting" is reflected by a steep slope 15, taken as the ratio of splitting force (y)/distance (x) at 7 mm in from the leading tape edge in the splitting graph (as shown in FIGS. 12 to 16). A high "jolting risk" may also lead to an increased risk of unsuccessful roll changes.

Figure 12:
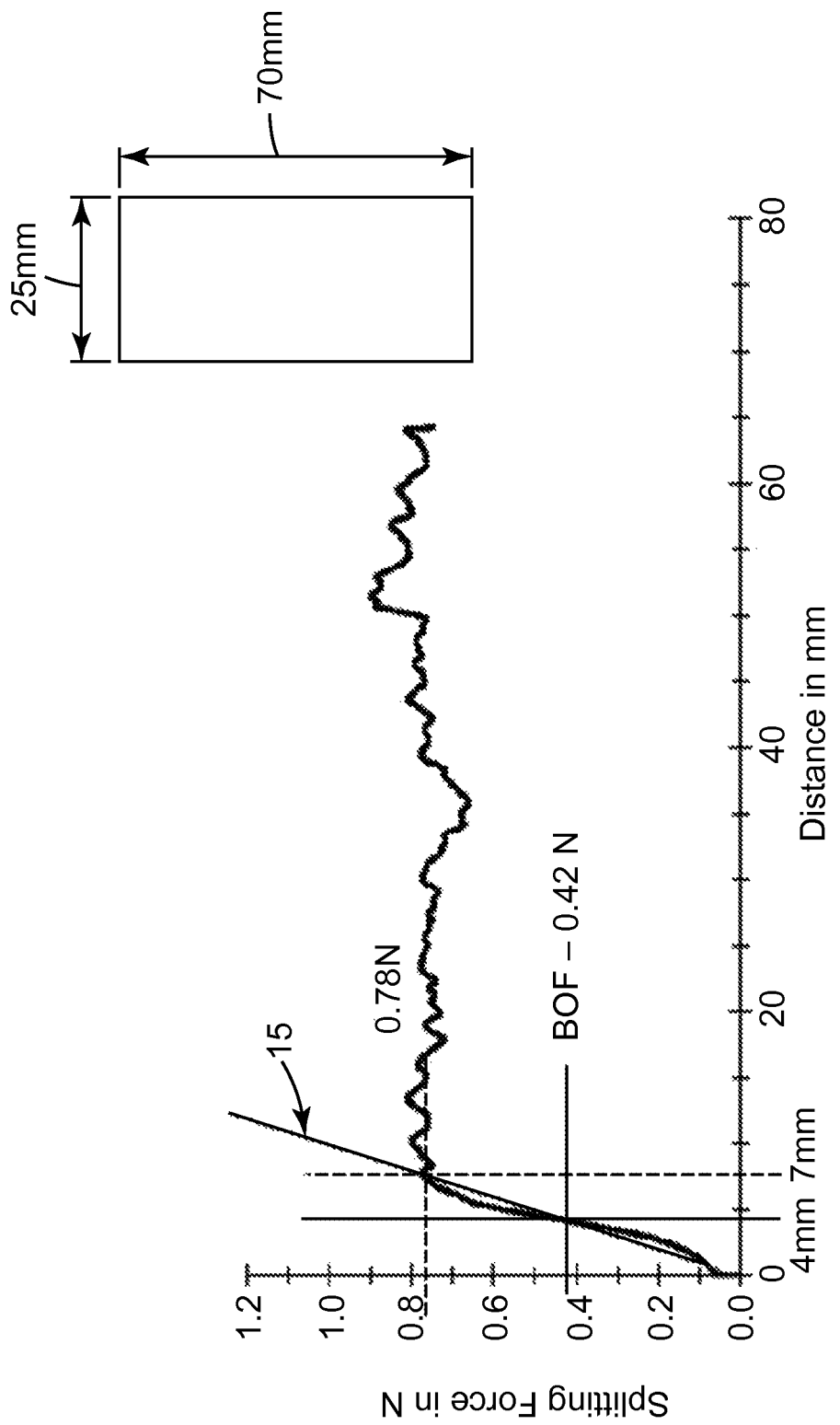
FIG. 12 is a diagram representing the splitting force of a splitting layer having a rectangular shape with 70 mm width (Y-axis) and a length (X-axis) of 25 mm (comparative example).

FIG. 12 shows a diagram representing the splitting force of a splitting layer having a rectangular shape with 70 mm width (Y-axis) and a length (X-axis) of 25 mm (comparative example). FIG. 12 shows a typical curve with a high "jolting risk". The steep slope 15, combined with a high breakout force (0.42 N, taken as reference), and continuing high peel force (splitting force beyond 7 mm in from leading edge) is more prone to cause a sharp increase in web tension at the instant of splice, leading to a higher risk of unsuccessful roll changes. This particular splitting layer execution has however a minimal risk of "pre-splitting". The measure of the "jolting risk", reflected by slope 15 and taken as the ratio of splitting force (y)/distance (x) at 7 mm in from the leading tape edge in the splitting graph, corresponds to 0.11 N/mm.

Figure 13:
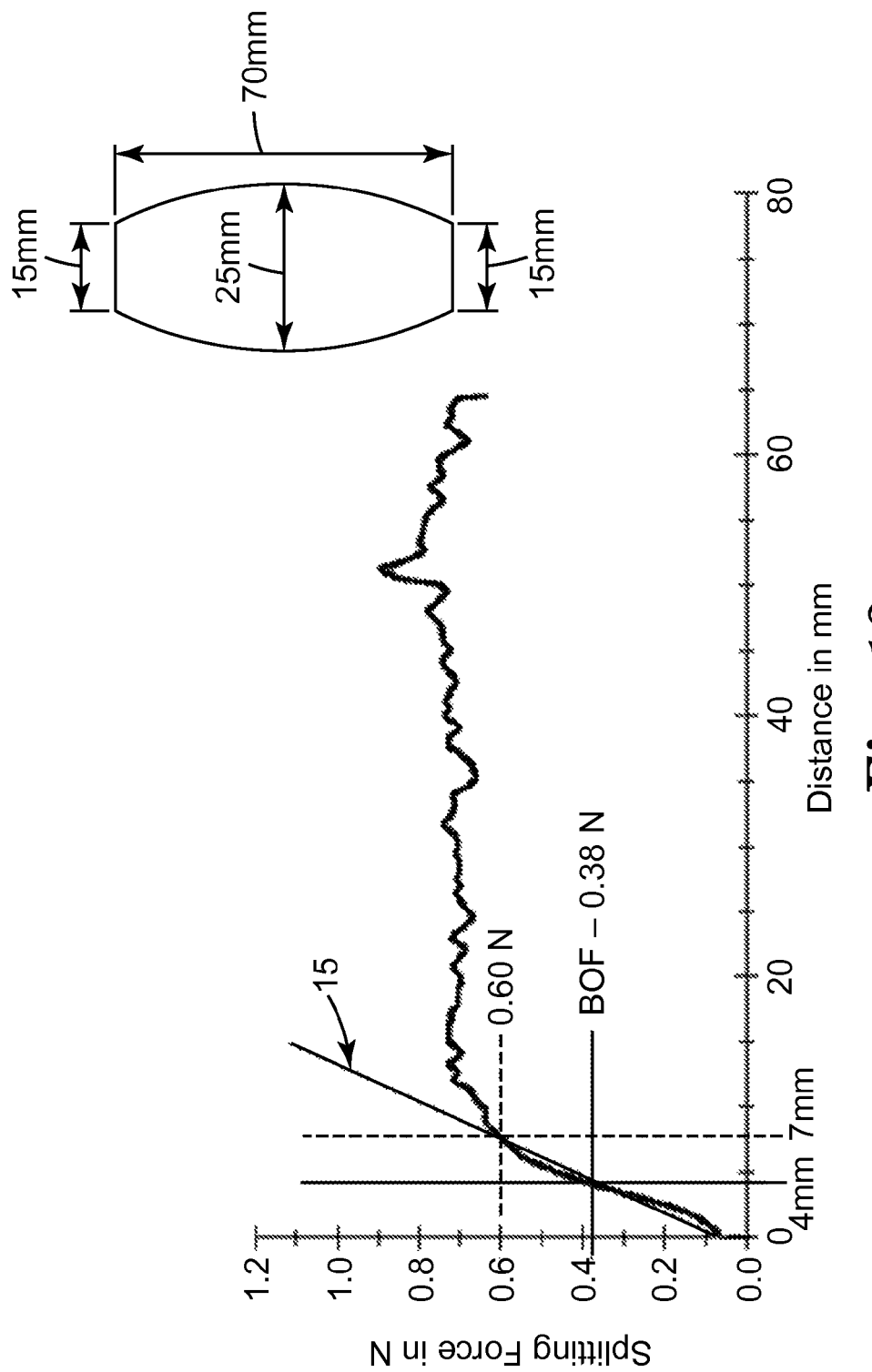
FIG. 13 is a diagram representing the splitting force of a splitting layer in the form of a flathead ellipse with 70 mm width (Y-axis) and a maximum length (X-axis) of 25 mm in the middle and 15 mm length of the flattened tips as for use in the present invention.

FIG. 13 shows the splitting force diagram of a splitting layer in the form of a flathead ellipse with 70 mm width (Y-axis) and a maximum length (X-axis) of 25 mm in the middle and 15 mm length of the flattened tips as for use in the present invention. The splitting layer configuration with tapered protrusions combined with flattened tips projecting towards both longitudinal edges of the splicing tape affords a significant reduction in the slope (22% reduction) leading to a smoother, more gradual opening profile. The measure of "jolting risk", reflected by slope 15, corresponds to 0.086 N/mm. The breakout force, which reflects the risk of "pre-splitting", is decreased by only 9.5% (i.e. less than 10%) and corresponds to 0.38 N. This, together with a maximum peel force not significantly higher than the splitting force at 7 mm, affords a balanced splitting profile with a significantly lower "jolting risk" combined with a high enough breakout force to afford a minimal risk of "pre-splitting".

Figure 14:
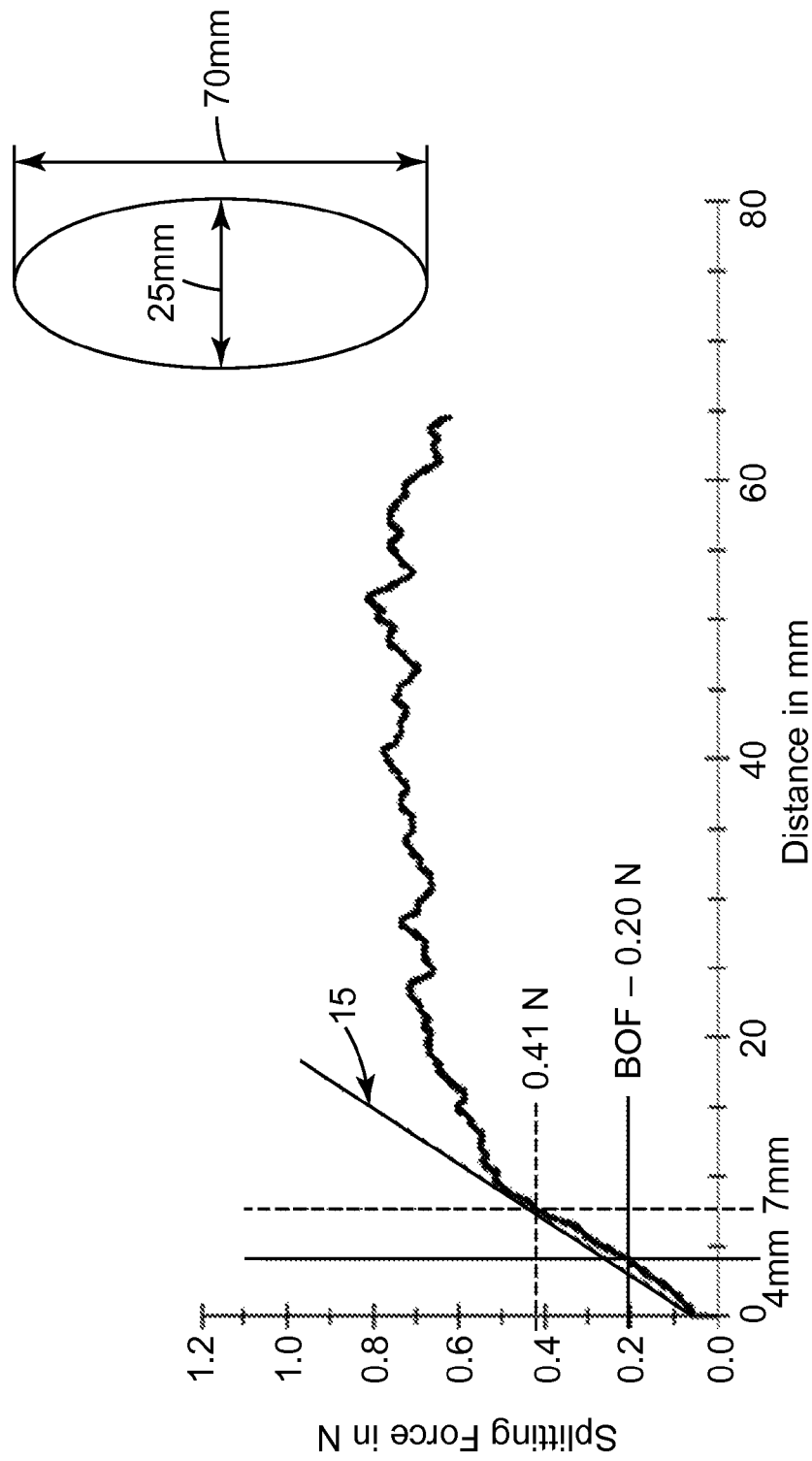
FIG. 14 is a diagram representing the splitting force of a splitting layer in the form of an ellipse with 70 mm width (Y-axis) and a maximum length (X-axis) of 25 mm in the middle (comparative example).

FIG. 14 shows a diagram representing the splitting force of a splitting layer in the form of an ellipse with 70 mm width (Y-axis) and a maximum length (X-axis) of 25 mm in the middle (comparative example), wherein the depicted splitting layer configuration comprises tapered protrusions identical to that of FIG. 13 but without flattened tips. The absence of flattened tips leads to a sharp decrease in the slope compared to that of FIG. 13. While this change greatly reduces the "jolting risk", it also sharply reduces the breakout force leading to a high risk of pre-splitting. The measure of "jolting risk", reflected by slope 15, corresponds to 0.057 N/mm (48% reduction), while the breakout force is decreased by 52% amounting to only 0.20 N.

Figure 15:
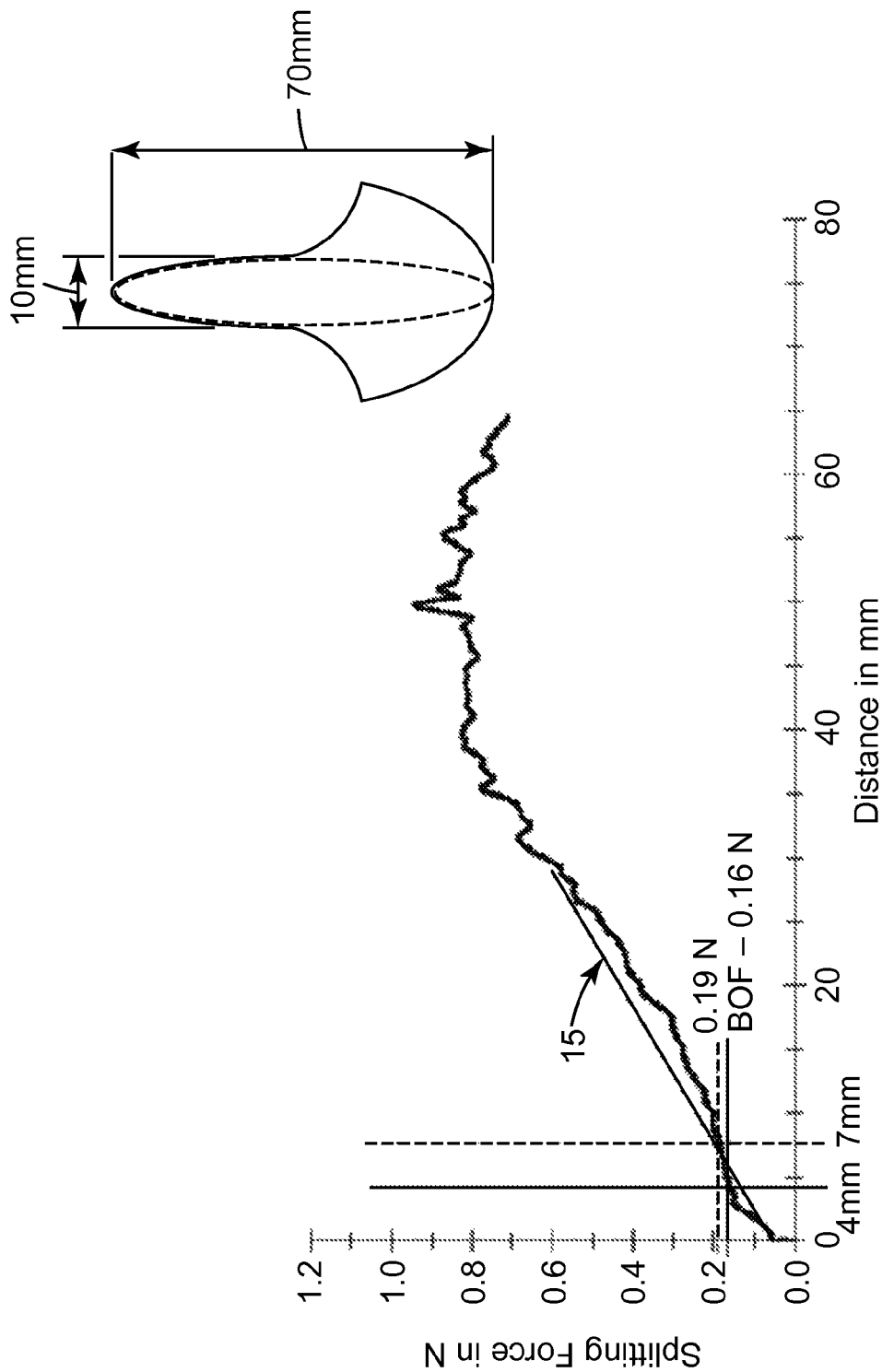
FIG. 15 is a diagram representing the splitting force of a splitting layer in the form of an ellipse with 70 mm width (Y-axis) and a maximum length (X-axis) of 10 mm in the middle (comparative example).

FIG. 15 is a diagram representing the splitting force of a splitting layer in the form of an ellipse with 70 mm width (Y-axis) and a maximum length (X-axis) of 10 mm in the middle (comparative example). As such, FIG. 15 shows the effect on the splitting profile when narrower tapered protrusions are used, again without flattened tips. The slope is this time very gradual (virtually no risk of jolting), but unavoidably, the breakout force is reduced to a level which introduces an even higher risk of pre-splitting. The measure of "jolting risk", reflected by slope 15, corresponds to 0.027 N/mm (75% reduction), while the breakout force is decreased by 62% amounting to only 0.16 N. Accordingly, a splicing tape with a splitting layer profile as described in FIG. 15, is much more prone to cause pre-splitting and even pre-opening during spin up of the new roll prior to splicing operation.

Figure 16:
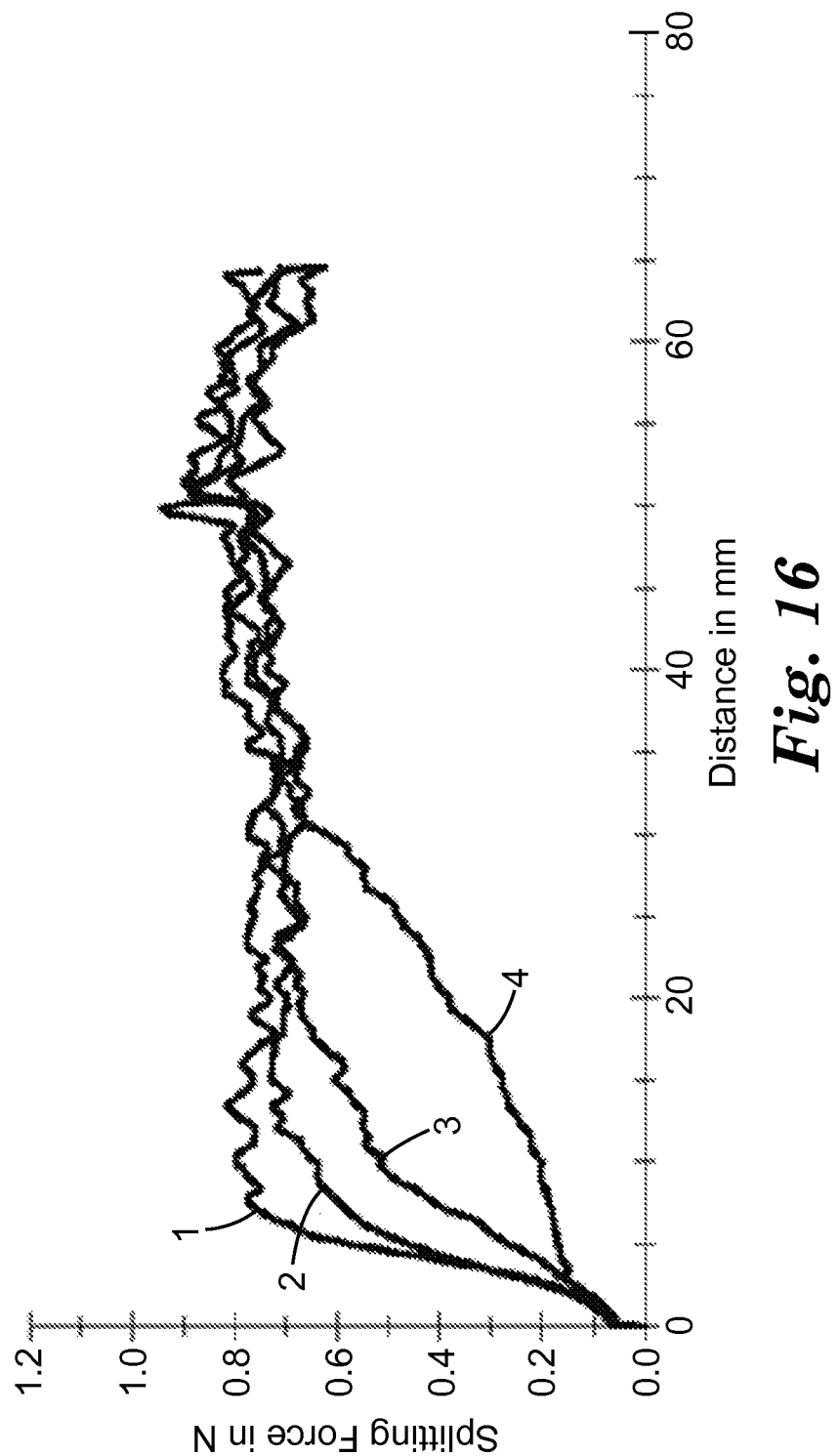
FIG. 16 is a compilation of the splitting force diagrams represented in FIGS. 12 to 15.

In FIG. 16, all diagrams are compiled so as to allow a direct comparison between the comparative examples and the example according to the invention. The following references apply to FIG. 16: diagram 1 (FIG. 12); diagram 2 (FIG. 13); diagram 3 (FIG. 14) and diagram 4 (FIG. 15).

In summary, the splicing tapes according to the invention show a smooth splitting behaviour combined with a low tendency for pre-splitting.

The invention claimed is:

1. A splicing tape for continuous roll change, said splicing tape comprising:
   a first tape component including a first backing layer and a first adhesive layer on a first surface of said first backing layer,
   a second tape component including a second backing layer and a second adhesive layer on a first surface of said second backing layer and
   a splitting layer joining said first backing layer and said second backing layer together, such that said first and second adhesive layers are facing away from the splitting layer,
   characterized in that said splitting layer comprises a continuous and uninterrupted middle area extending in the longitudinal direction of said splicing tape and provided with repeating tapered protrusions with flattened tips projecting from said middle area towards both longitudinal edges of said splicing tape.

2. The splicing tape according to claim 1, characterized in that the flattened tips are recessed from the longitudinal edges of said splicing tape.

3. The splicing tape according to any of claim 1, characterized in that the splitting layer extends over at least 70% of the tape width.

4. The splicing tape according to claim 1, characterized in that the splitting layer is centrically arranged on the longitudinal axis of said splicing tape.

5. The splicing tape according to claim 1, characterized in that the flattened tips have straight edges, which are arranged substantially parallel to the longitudinal edges of said splicing tape (1).

6. The splicing tape according to claim 1, characterized in that the flattened tips are bent so that the ratio of the base width (w) of the tip to the height (h) of the tip is at least 1:1.

7. The splicing tape according to claim 1, characterized in that on one or both longitudinal edges of said tape, the ratio of the average width (w) of the flattened tips in the longitudinal direction to the average distance (d) between adjacent flattened tips ranges from 10:1 to 1:10.

8. The splicing tape according to claim 1, characterized in that the repeating tapered protrusions exhibit substantially same or different profiles, wherein the profiles are substantially identical on each side of the middle area.

9. The splicing tape according to claim 1, characterized in that the repeating tapered protrusions on opposing sides of the middle area are arranged mirror symmetrically.

10. The splicing tape according to claim 1, characterized in that the repeating tapered protrusions on opposing sides of the middle area are arranged offset.

11. The splicing tape according to claim 1, characterized in that the side edges of the repeating tapered protrusions are bent, serrated, concave, convex and/ or straight, and are ellipsoidal, semi-circular, sinusoidal, parabolic or hyperbolic.

12. The splicing tape according to claim 1, characterized in that the material of the splitting layer is chosen from the group consisting of splittable paper, adhesives, splittable films, UV cured layers, electrostatically adhered surfaces-layers bonded via Van der Waals forces or other similar forces, and any combinations thereof; wherein the material of the splitting layer is chosen from an adhesive.

13. A method of manufacturing a splicing tape for continuous roll change, said method comprising the steps of:
   providing a first tape component including a first backing layer and a first layer of adhesive;
   providing a second tape component including a second backing layer and a second layer of adhesive;
   applying a splitting layer to either one or both of said first and second backing layers, such that said first and second adhesive layers are facing away from the splitting layer; and
   laminating said first and second tape components together with said splitting layer between said first and second backing layers,
   characterized in that said splitting layer comprises a continuous and uninterrupted middle area extending in the longitudinal direction of said splicing tape and provided with repeating tapered protrusions with flattened tips projecting from said middle area towards both longitudinal edges of said splicing tape.

* * * * *